(12) United States Patent
Tashiro et al.

(10) Patent No.: US 6,344,107 B1
(45) Date of Patent: Feb. 5, 2002

(54) AUTOMATIC DEPOSITION MACHINE

(75) Inventors: Hitoshi Tashiro, Toyota; Takao Shigihara; Takeshi Ito, both of Fukushima; Kazuto Sawada, Toyota, all of (JP)

(73) Assignee: Tohoku Munekata Co., Ltd. (JP)

( * ) Notice: Subject to any disclaimer, the term of this patent is extended or adjusted under 35 U.S.C. 154(b) by 0 days.

(21) Appl. No.: 09/474,227

(22) Filed: Dec. 29, 1999

(51) Int. Cl.[7] .............................................. B29C 65/22
(52) U.S. Cl. ................. 156/379.8; 156/380.5; 156/380.6; 156/498
(58) Field of Search .................. 156/73.5, 272.2, 156/308.2, 309.6, 323, 379.6, 379.8, 379.9, 380.5, 380.6, 380.8, 498, 275.1; 219/200, 633, 636, 659; 428/31; 280/770

(56) References Cited

U.S. PATENT DOCUMENTS

| 3,752,521 | A | * | 8/1973 | Lafebre |
| 4,364,591 | A | * | 12/1982 | Bien |
| 4,514,003 | A | * | 4/1985 | Guy |
| 4,546,021 | A | * | 10/1985 | Mears |
| 4,878,273 | A | * | 11/1989 | West et al. |
| 5,956,918 | A | * | 9/1999 | Wise |
| 5,975,599 | A | * | 11/1999 | Goldstein |

FOREIGN PATENT DOCUMENTS

JP    S63(1988)-13734    1/1988

* cited by examiner

*Primary Examiner*—Jeff H. Aftergut
*Assistant Examiner*—John T. Haran
(74) *Attorney, Agent, or Firm*—McGlew and Tuttle, P.C.

(57) ABSTRACT

Improved efficiency of deposition work between a protection trimming and a clip seat of an automobile is provided with an automatic deposition machine having wire heating elements (3a and 3b), a first connection member (1) connected to one end of the wire heating elements (3a and 3b), a movement mechanism for moving the first connection member (1), a second connection member (2) that can be connected to the other end side of the wire heating elements (3a) and (3b) and a bending jig (5) for overlapping the clip seat the member for the protection trimming. The dip seat and the protection trimming are interconnected, to the rear face of the protection trimming via the wire state heating elements (3a and 3b), the retainer member (4) for retaining the said overlapped clip seats, and the power source for carrying the electric current between the said first connection member and the said second connection member. In addition, the wire heating element is designed with a pipe structure. The cooling gas is passed inside the pipe structured heating element after the deposition between the clip seat and the protection trimming by the electrification.

12 Claims, 5 Drawing Sheets

AUTOMATIC DEPOSITION MACHINE

FIELD OF THE INVENTION

The present invention relates to an automatic deposition machine, and in particular relates to the technology for depositing members for a protection trimming with high efficiency.

BACKGROUND OF THE INVENTION

For protecting the outside panels of automobile bodies and doors, it has been known to use protection trimming made of band state synthetic resin as an addition to the outside panels of automobile bodies and doors.

Figure 9:
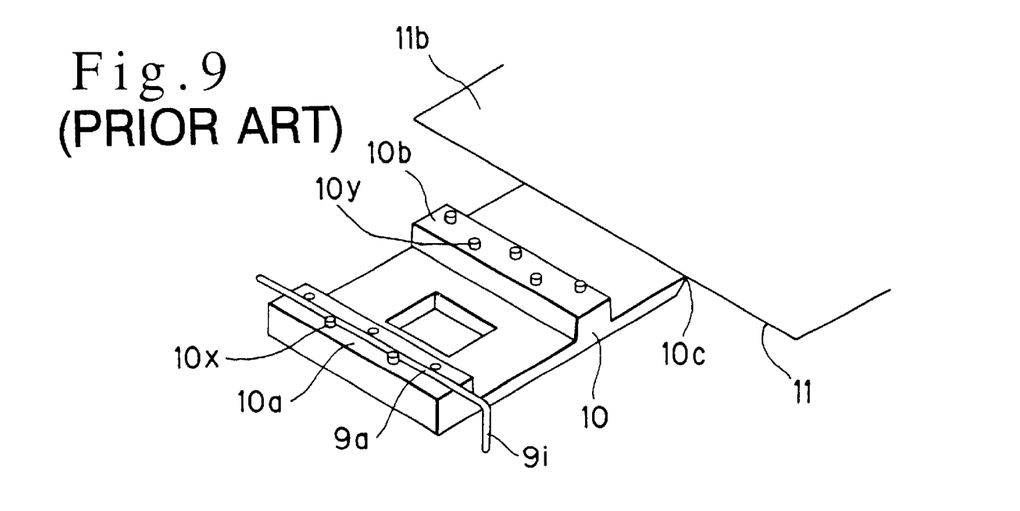
FIG. 9 is an explanatory view of conventional example.
Figure 10:
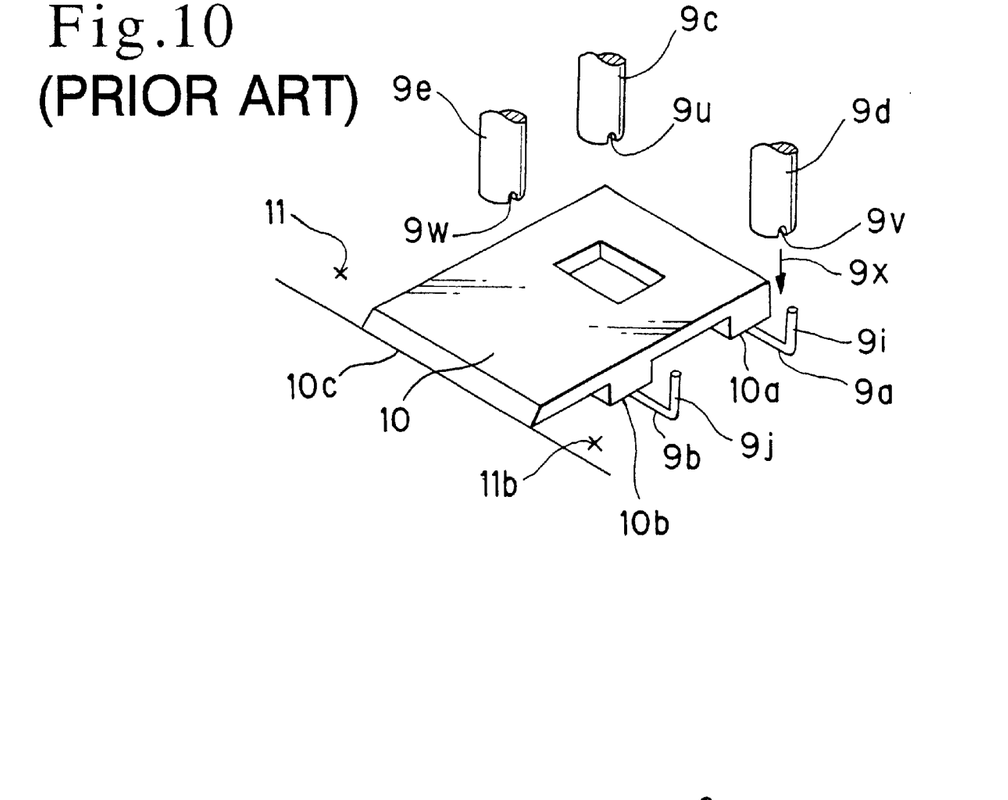
FIG. 10 is an explanatory view of conventional example and is the continuation of FIG. 9.
Figure 11:
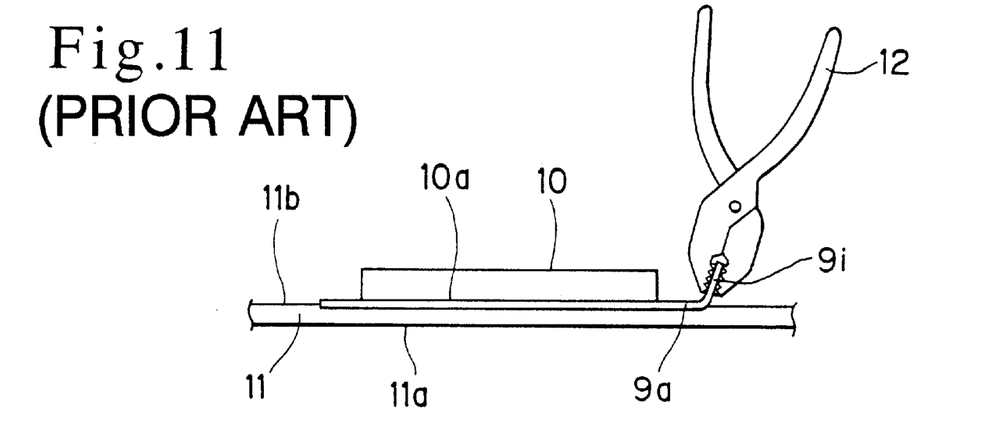
FIG. 11 is an explanatory view of conventional example and is the continuation of FIG. 10.

FIG. 9 through FIG. 11 show the conventional examples of a mounting method of such protection trimming. In FIG. 9 through FIG. 11, a pair of wire heating elements 9a and 9b is provided for depositing clip seat 10 and the protection trimming 11. The bent portion 9i is formed on the other end of heating element 9a to be described later, and the bent portion 9j is formed on the other end side of heating element 9b to be described later.

If the terminal 9c should be moved in the arrow 9x direction, the groove 9u of terminal 9c is connected to one side of heating element 9a, and similarly the groove 9v of terminal 9d is connected to the other end side of heating element 9b. Furthermore, the groove 9w of terminal 9e is connected to one end side of heating element 9b, and the groove (corresponding to the groove 9v) of terminal (corresponding to the terminal 9d) which is not shown in FIG. 10 is connected to the other end side of heating element 9b.

The clip seat 10 has a pair of protrusive faces 10a and 10b. A great number of pins 10x are formed on the protrusive face 10a and a great number of pins 10y are formed on the protrusive face 10b. The protection trimming 11 is in band-state, Numeral 11a is the surface of the protection trimming 11, and Numeral 11b is the rear face of the protection trimming 11. The clip seat 10 and the protection trimming 11 are coupled by the hinge state coupling portion 10c, and are molded integral by the synthetic resin.

The heating element 9a is arranged such that it may be caught by the pins 10x of protrusive face 10a, and the heating element 9b is arranged such that it may be caught by the pins 10y of protrusive face 10b. FIG. 9 shows the status before the heating element 10b is arranged.

If the electric current should be provided to the heating elements 9a and 9b via the terminals (9v, etc.) with the clip seat 10 being bent at the coupling portion 10c and the pins 10x and 10y being contacted to the rear face 11b of the protection trimming 11, the pins 10x and 10y and the rear face 11b of the protection trimming 11 are deposited by the Joule heat of heating elements 9a and 9b.

Thereafter, the heating elements 9a and 9b are pulled out of the deposited portion using a pair of pliers 12.

The time needed for each process will be (1) 5 seconds per piece in case of the set of heating elements 9a and 9b, (2) 2 seconds per piece in case of the bending (integral hinge mono-block molding) of clip seat 10, (3) 5 seconds per sheet in case of work pieces (clip seat 10 and the protection trimming 11) set to the machine, (4) 2 seconds in (a) work piece locking, 1 second in the descent of (b) terminals (9v, etc.) and clip seat pressurizing unit, 10 second in (c) voltage impression (heat generation and deposition), 16 seconds in the machine cycle, 1 second in the ascent of (d) terminals (9v, etc.) and clip seat the pressurizing unit and 2 seconds in (e) the work piece lock release in case of the machine operation, (5) 5 seconds per sheet in taking out the work piece and (6) 5 seconds per sheet in pulling out the heating elements 9a and 9b using a pair of pliers.

Furthermore the necessary work time (e.g., worker time) are as follows as shown in Table 1:

TABLE 1

| | Front door Protection trimming | Rear door Protection trimming | Fender Protection trimming |
|---|---|---|---|
| Number of clips | At 6 places | At 4 places | At 2 places |
| Number of heating elements | 12 pieces | 8 pieces | 4 pieces |
| Total of work time | 142 seconds | 98 seconds | 34 seconds |

However, in the above described conventional example, the deposition process between the clip seat 10 and the protection trimming 11 is complex and the efficiency of deposition work proved to be inferior.

SUMMARY AND OBJECTS OF THE INVENTION

The present invention has been contrived in view of these problematic points, and its object is to present the automatic deposition machine that can automatically conduct the position between the clip seat and the protection trimming.

The present invention attains this goal by providing an automatic deposition or connection machine with a wire state or shaped heating element. A first connection member is connected to one end of the heating element. A movement means moves the first connection member. A second connection member is connectable to another end side of the heating element. A bending jig overlaps a clip seat of a member of the protection trimming. The clip seat and the protection trimming are interconnected, at a rear face of the protection trimming, via the heating element. A retainer member retains the overlapped clip seat, and a power source carries electric current between the first connection member and the second connection member.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
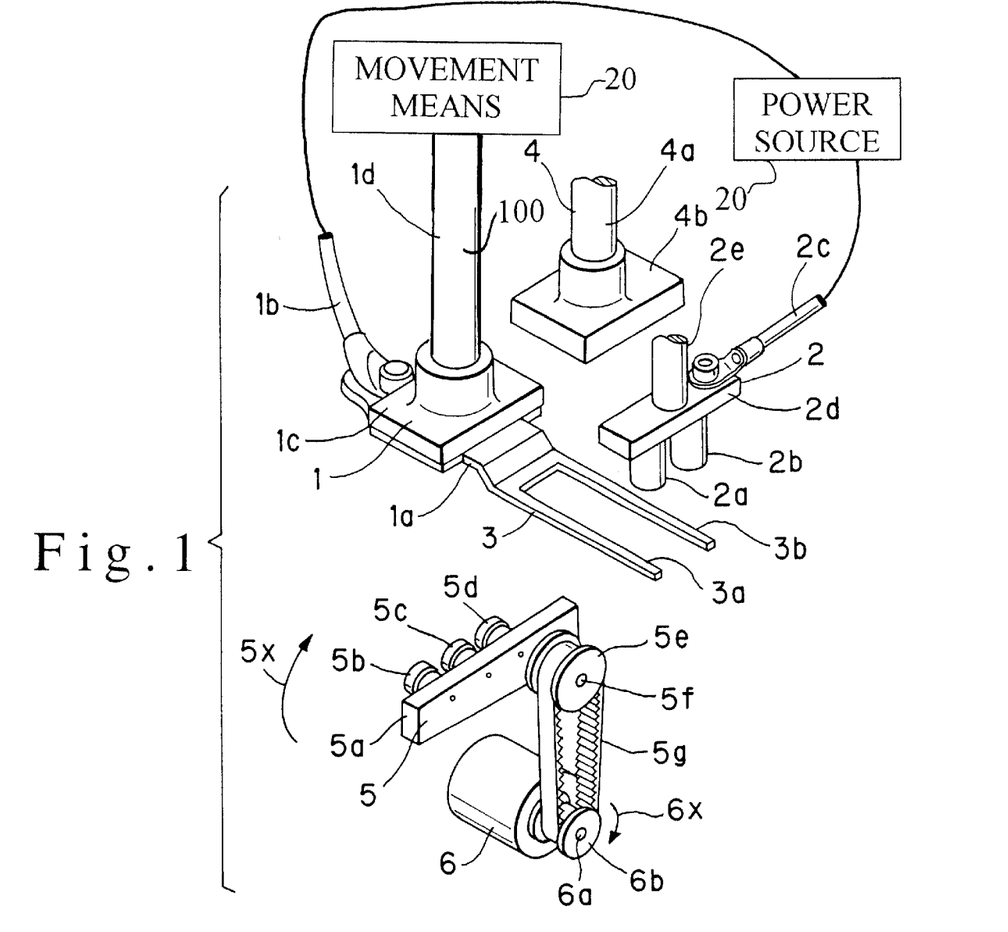
FIG. 1 is an oblique view showing the major portion of automatic deposition machine relating to the pattern of embodiment according to this invention.
Figure 2:
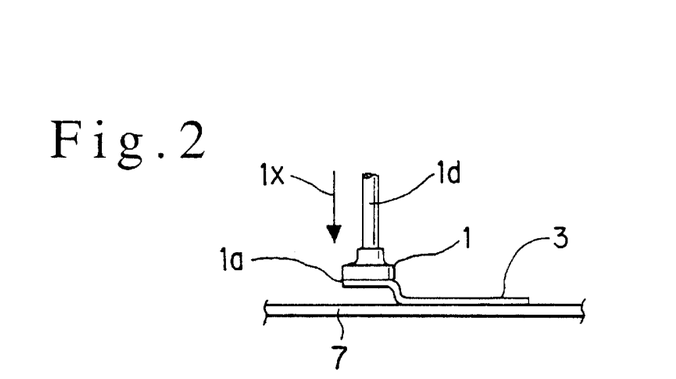
FIG. 2 is a lateral face view showing a part of the automatic deposition machine.
Figure 3:
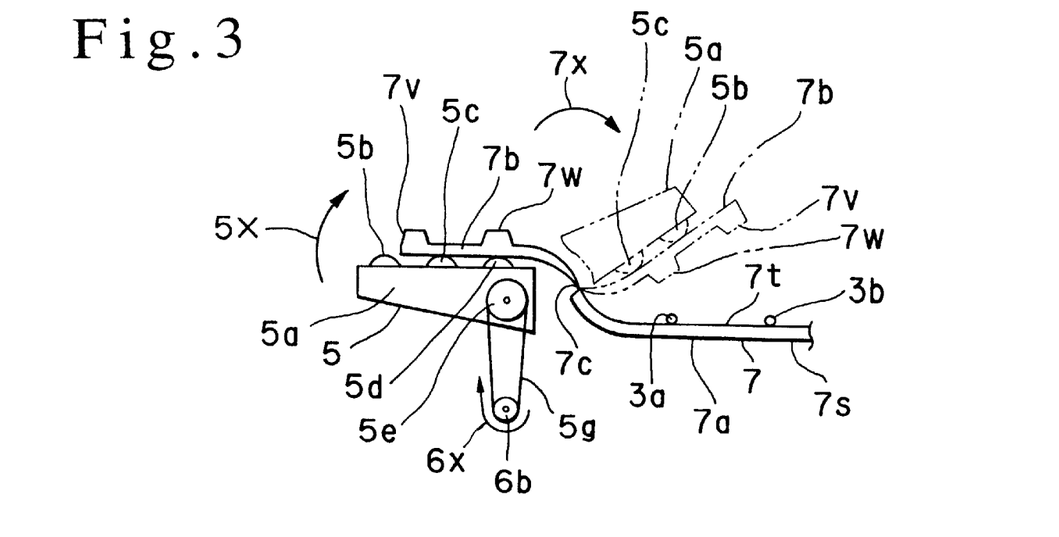
FIG. 3 is a first explanatory view explaining the operation of the automatic deposition machine.
Figure 4:
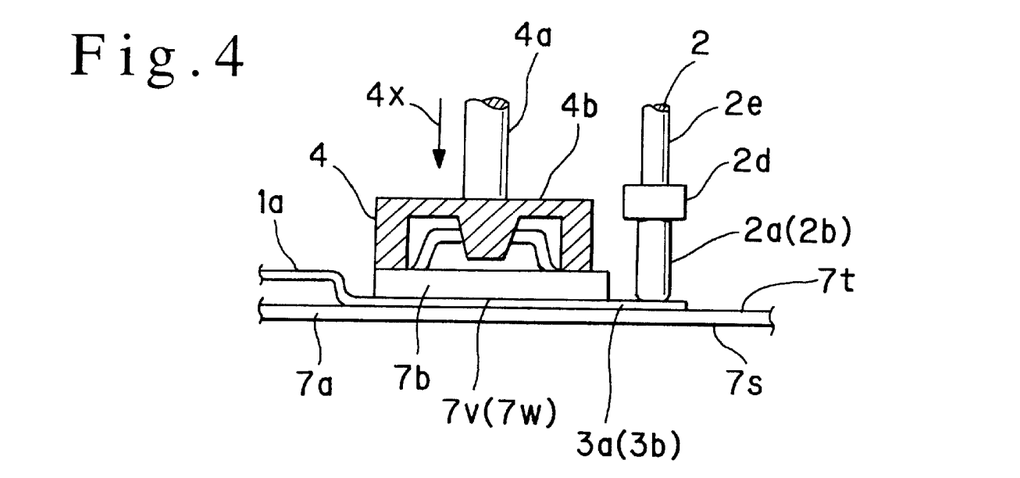
FIG. 4 is a second explanatory view explaining the operation of the automatic deposition machine.
Figure 5:
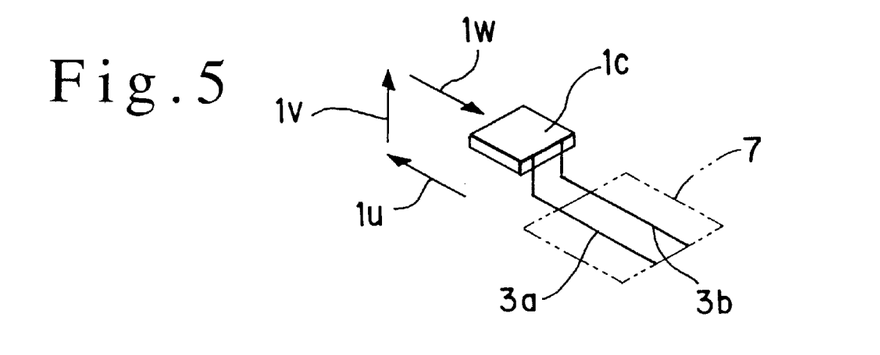
FIG. 5 is a third explanatory view explaining the operation of the automatic deposition machine.

The embodiments of the present invention are explained on the basis of the drawings. FIG. 1 shows the major portion of an automatic deposition machine relating to an embodiment according to this invention. FIG. 2 shows a part of an automatic deposition machine, and FIG. 3 through FIG. 5 are views to explain the operation of the automatic deposition machine.

In FIG. 1 through FIG. 5, the major portions of the automatic deposition machine 100 are the first connection member 1, the second connection member 2, the heat generation member 3, the retainer member 4, the bending jig 5 and the motor 6.

The first connection member 1 is equipped with the terminal 1a, the lead 1b, the holding portion 1c and the rod 1d. The holding portion 1c is fixed to the lower end of rod 1d, and the terminal 1a is fixed to the lower face of holding portion 1c. The lead 1b is connected to the end of terminal 1a. The rod 1d is movable by the actuator or movement means 20 shown in FIG. 1.

The second connection member 2 is equipped with the terminals 2a and 2b, the lead 2c, the support device 2d and the rod 2e. The terminal 2a and the terminal 2b are a pair and are fixed to the lower face of support device 2d. The support device 2d is fixed to the lower end of rod 2e. The lead 2c is locked to the upper face of the support device 2d, and connected to the terminal 2a and 2b . The rod 2e can be moved in the vertical direction (the direction of arrow 1x and the reverse direction against the arrow 1x) by the hydraulic cylinder not shown in FIG. 1.

The heat generation member 3 is equipped with a pair of wire-state heating elements 3a and 3b. The heating elements 3a and 3b are respectively formed integrally with the terminal 1a. The material of terminal 1a and heating elements 3a and 3b is SUS spring steel, and has the same degree of electric resistance as nickel chrome wire. The terminal 1a has a great cross sectional area in the route of the electric current, so its resistance is small and doesn't substantially generate the heat, but the heating elements 3a and 3b have a small cross sectional area in the electric current route and moreover the electric current route is provided for a long duration, so they become heating members in a manner which is similar to that of the nickel chrome wire.

The retainer member 4 is equipped with the rod 4a and the retainer plate 4b. The retainer plate 4b is fixed to the lower end of rod 4a. The rod 4a can be moved in the vertical direction (the arrow 4x direction and the direction reverse to the arrow 4x direction) by the hydraulic cylinder not shown in FIG. 1 (see FIG. 4).

The bending jig 5 is equipped with the support plate 5a, the rollers 5b, 5c and 5d and the gear 5e. The rollers 5b, 5c and 5d are mounted to the support plate 5a in such a way that they can be rotated. The gear 5e is locked to the support plate 5a. When the gear is rotated by the motor 6, described below, the support plate 5a is turned in the arrow 5x direction and the direction reverse to the arrow 5x with the center shaft 5f of gear 5e as the rotation center.

The motor 6 is a servomotor, and the rotation angle of motor 6 can be controlled. The gear 6b is locked to the rotary shaft 6a of motor 6. The toothed belt 5g is arranged in such a manner that it may transmit the rotation of gear 6b to the gear 5e. If the gear 6b is turned to the arrow 6x direction by the rotation of motor 6, the support plate 5a is turned in the arrow 5x direction, and if the gear 6b is turned in the direction reverse to the arrow 6x direction, then the support plate 5a is turned in the direction reverse to the arrow 5x direction.

The member 7 for the protection trimming is made of synthetic resin, and is equipped with the protection trimming 7a and the clip seat 7b. The hinge-state coupling portion 7c couples the protection trimming 7a and the clip seat 7b.

The member 7 for the protection trimming is set on the automatic deposition machine (at this time, the surface 7s of the protection trimming 7a of the member 7 for the protection trimming comes to a lower side than the rear face 7t), the rod Id is moved to the arrow 1x direction as shown in FIG. 2 and FIG. 3, and heating element 3 is placed on the rear face 7t of the protection trimming 7a of the member 7 for the protection trimming.

Next, when the motor is turned for rotating the support plate 5a in the arrow 5x direction, then the clip seat 7b of the member 7 for the protection trimming is pressed by the rollers 5b, 5c and 5d mounted to the support plate 5a and is turned in the arrow 7x direction as shown in FIG. 3, the protrusive face 7w of clip seat 7b gets in contact with the heating element 3a and the protrusive face 7v of clip seat 7b gets in contact with the heating element 3b.

Then, the retainer member 4 and the second connection member 2 descend as shown in FIG. 4. The descended retainer member 4 presses down the clip 7b, and the terminal 2a is connected to the tip of heating element 3a and the terminal 2b is connected to the tip of heating element 3b in the descended second connection member 2.

If the voltage is impressed between the lead 1b and the lead 2c thereafter, the electric current flows to the heating elements 3a and 3b, and the protrusive faces 7v and 7w of clip seat 7b can be deposited with the rear face 7t of the protection trimming 7a by the Joule heat of heating elements 3a and 3b.

Next, when the holding portion 1c of first connection member 1 is moved in the direction of arrow 1u as shown in FIG. 5, the heating elements 3a and 3b get separated from the deposited portion of the member 7 for the protection trimming. Thereafter, the holding portion 1c is moved sequentially in the arrow 1v and 1w directions for putting the first connection member 1 in a stand-by state.

Figure 6:
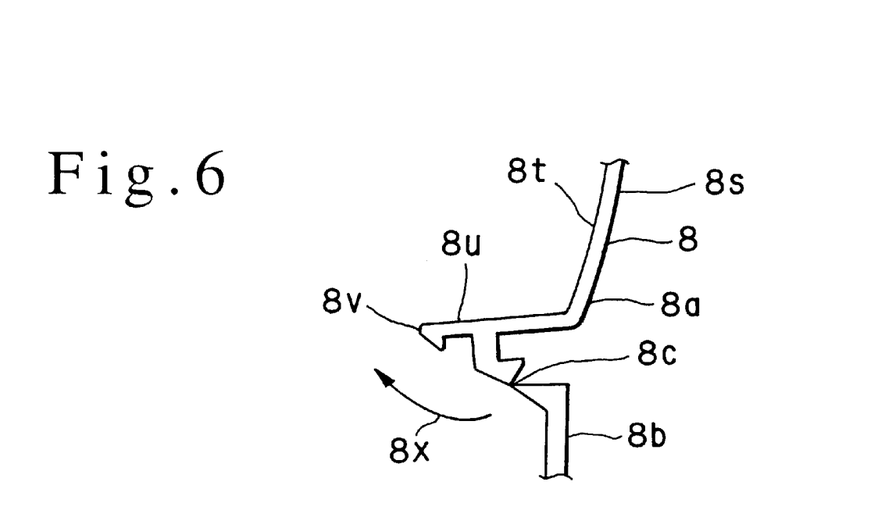
FIG. 6 is an operation explanatory view of reference example in comparison with the operation of the automatic deposition machine.
Figure 7:
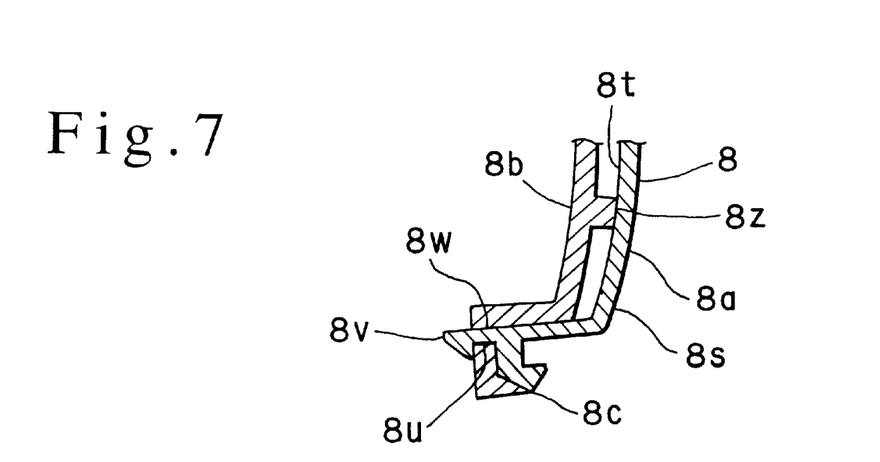
FIG. 7 is an operation explanatory view of the reference example, and is the continuation of FIG. 6.

Should there be no retainer member 4 and the bending jig 5, then the member 8 for the protection trimming becomes necessary in place of the member 7 for the protection trimming as shown in FIG. 6 and FIG. 7. The member 8 for the protection trimming is made of elastic synthetic resin, and is equipped with the protection trimming 8a and the clip seat 8b. The hinge-state coupling portion 8c couples the protection trimming 8a and the clip seat 8b. A protrusive portion 8u is provided to the rear face 8t of the protection trimming 8a. Numeral 8v is a key claw-state tip of protrusive portion 8u, and Numeral 8s is the surface of the protection trimming 8a. The protrusive face 8z and the hole 8w are formed on the clip seat 8b.

If the clip seat 8b should be turned in the arrow 8x direction and the protrusive face 8z of clip seat 8b should be made contact with the rear face 8t of the protection trimming 8a, the protrusive portion 8u needs to be inserted into the hole 8w of clip seat 8b and the tip 8v of protrusive portion 8u needs to be prevented from pulling out.

From the above description, the time needed for operating the automatic deposition machine 100 is as follows: (1) 5 seconds per sheet in the setting of work piece (the member 7 for the protection trimming) to the machine, (2) in the machine operation, (a) 2 seconds in fixing the work piece, (b) 1 second in the descent of heating elements 3a and 3b, (c) 1 second in bending the hinge-state coupling portion 7c, (d) 1 second in the descent of the second connection member 2 and the retainer member 4, (e) 10 seconds in voltage impression (heat generation and deposition), 20 seconds in the machine cycle, (f) 1 second in the ascent of the second connection member and the retainer member 4, (g) 2 seconds in the retreat (retraction) of heating elements 3a and 3b, (h) 2 seconds in the work piece taking out the work piece. The other necessary work time includes 10 seconds (constant with no regard to the kinds of protection trimming).

For this reason, the work time of 132 seconds maximum can be decreased by conducting the automation in comparison with the above mentioned conventional example.

Figure 8:
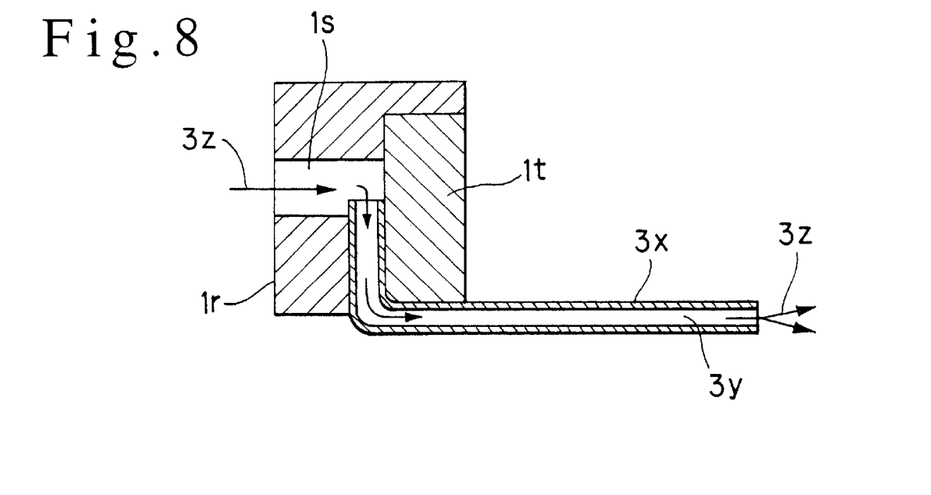
FIG. 8 is a cross sectional view of deformed example in the pattern of the embodiment.

FIG. 8 shows the case where the wire-state heating elements 3a and 3b are shaped to the pipe status. In FIG. 8, a pipe structured heating-element 3x is fixed to the main body 1r by the pipe retainer 1t. The hole Is of main body 1r is interconnected with the hole 3y of pipe structured heating-element 3x. The main body 1r acts as the conductive terminal similarly to the terminal 1a (see FIG. 1), and the lead not shown in the figure (corresponding to the lead 1b) is connected to it. The arrow 3z shows the flow of compressed air for cooling to be flown after the deposition of the clip seat 7b and the protection trimming 7a.

For this reason, in the automatic deposition machine 100 according to the structure of the invention, if the first connection member 1 connected to one end of wire state heating elements 3a and 3b should be moved by the movement means for arranging the wire state heating elements 3a and 3b to the rear face 7t of the protection trimming 7a, the clip seat 7b of the member 7 for the protection trimming should be folded down on the rear face 7t of the protection trimming 7a via the wire state heating elements 3a and 3b by use of the bending jig 5, and the electric current should be flown to the wire state heating elements 3a and 3b by the power source 22 connected between the first connection portion 1 and the second connection portion 2 with the second connection portion 2 being connected to the other end side of the wire state heating elements 3a and 3b, then the protection trimming 7a and the clip seat 7b that are arranged catching the wire state heating elements 3a and 3b can be deposited by the Joule heat of wire state heating elements 3a and 3b.

Further, after the deposition between the clip seat 7b and the protection trimming 7a by the electrification, the cooling of the pipe structured heating element 3x and the deposited portion can be quickened (can be cooled down in about 1 second) by passing the cooling gas inside the pipe structured heating element 3x for forcedly cooling it down. The time required for cooling in case of the natural heat release after the deposition will be about 6 seconds. Further, the time needed for the deposition is about 2.5 seconds, and the time required for pulling out the pipe structured heating element 3x, after the deposition, is about 1.5 seconds. For this reason, the time needed until pulling out the pipe structured heating body 3x, since the impression of voltage, becomes about 5 seconds, and can be decreased to half by using the pipe structured heating element 3x.

Moreover, because the heat generated during the deposition can be released by the forced air cooling, the heat strain to the design face of the deposited portion can be decreased. In addition, the rigidity of pipe structured heating element 3x can be enhanced by adopting the pipe status design, and can prevent the deformation (bending) of heating element that was caused in the solid round wire state heating element like the heating elements 3a and 3b.

According to the automatic deposition machine relating to the invention, the deposition between the protection trimming for automobile and the clip seat can be done automatically with high efficiency. For this reason, the work time necessary for the deposition between the protection trimming for automobile and the clip seat can be conspicuously decreased, and the automobile assembly efficiency can be enhanced.

Furthermore, according to another aspect of the invention, the cooling of the pipe structured heating element and the deposited portion can be quickened by passing the cooling gas inside the pipe structured heating element after the deposition between the clip seat and the protection trimming by the electrification, together with the effect available by the first aspect of the invention. For this reason, the work efficiency of the automatic deposition machine can be additionally improved.

While specific embodiments of the invention have been shown and described in detail to illustrate the application of the principles of the invention, it will be understood that the invention may be embodied otherwise without departing from such principles.

APPENDIX

List of Reference Numbers

100 . . . Automatic deposition machine
1 . . . The $1^{st}$ connection member
2 . . . The $2^{nd}$ connection member
3a, 3b . . . Wire-state heating elements
4 . . . Retainer member
5 . . . Bending jig
7 . . . Member for P-lace
7a . . . P-lace (protection lace) or protection trim
7b . . . Clip seat
3x . . . Pipe-state heating element

What is claimed is:

1. An automatic deposition machine for protection trimming with a clip seat, the machine comprising:

a heating element;

a first connection member connected to one end of said heating element;

a movement means for moving said first connection member with said heating element between a first position and a second position, said first position being between the clip seat and a side of the protection trimming, said second position being spaced from said protection trimming and said first position;

a second connection member that can be connected to another end side of said heating element;

a bending jig for overlapping the clip seat with the side of the protection trimming, the clip seat and the side of the protection trimming being interconnected via said heating element;

a retainer member for retaining the overlapped clip seat against the side of the protective trimming; and a power source for carrying the electric current between said first connection member and said second connection member.

2. An automatic deposition machine according to claim 1, wherein said heating element is designed as a pipe structured heating element and cooling gas is passed inside said pipe structured heating element after the deposition between said clip seat and the protection trimming by electrification.

3. A machine in accordance with claim 1, wherein:

said heating element has a wire shape.

4. A machine in accordance with claim 1, further comprising:

another heating element connected to said first connection member, said another heating element being movable with said heating element and said first connection member between said first and second positions.

5. A connection machine for a piece of trim having a clip, the machine comprising:

a bending jig receivable of the trim and foldable of the clip onto a side of the trim;

a retainer biasing the clip against the side of the trim;

a heating element movable between a first position and a second position, said first position being between the clip and the side of the trim, said second position being spaced from said trim and said first position;

a first heating terminal connected to one end of said heating element, said first heating terminal being movable with said heating element between said first and second positions while being connected to said heating element;

a second heating terminal movable into and out of connection with another end of said heating element when said heating element is in said first position.

6. A machine in accordance with claim 5, wherein:

said first and second heating terminals supply heating power to said heating element.

7. A machine in accordance with claim 5, further comprising:

movement means connected to said heating element for moving said heating element between said first and second positions, said movement means being connected to said heating element during heating of said heating element.

8. A machine in accordance with claim 5, wherein:

said heating element has a wire shape.

9. A machine in accordance with claim 5, further comprising:

first and second electrical leads connected to said first and second heating terminals respectively, said first electrical lead moving with said heating element between said first and second positions.

10. A machine in accordance with claim 5, further comprising:

another heating element connected to said first heating terminal, said another heating element being movable with said heating element and said first heating terminal between said first and second positions.

11. A machine in accordance with claim 5, wherein:

said heating element defines a gas passage.

12. A machine in accordance with claim 10, wherein:

said terminals supply heating power to said heating element;

movement means is connected to said heating element for moving said heating element between said first and second positions, said movement means being connected to said heating element during heating of said heating element;

said heating element has a wire shape;

first and second electrical leads are connected to said first and second heating terminals respectively, said first electrical lead moving with said heating element between said first and second positions;

another heating element is connected to said first heating terminal and connectable to said second heating terminal, said another heating element being movable with said heating element and said first heating terminal between said first and second positions.

\* \* \* \* \*

UNITED STATES PATENT AND TRADEMARK OFFICE
CERTIFICATE OF CORRECTION

PATENT NO.    : 6,344,107 B1
DATED         : February 5, 2002
INVENTOR(S)   : Hitoshi Tashiro It is certified that error appears in the above-identified patent and that said Letters Patent is hereby corrected as shown below:

<u>Drawings,</u>
Figure 1, change the reference numeral "20" for the box labeled "POWER SOURCE" to the numeral -- 22 --.

Signed and Sealed this

Third Day of September, 2002

Attest:

Attesting Officer

JAMES E. ROGAN
*Director of the United States Patent and Trademark Office*